(12) United States Patent
Schüler

(10) Patent No.: US 11,922,263 B2
(45) Date of Patent: Mar. 5, 2024

(54) METHOD OF AUTOMATICALLY SETTING UP A CODE READING DEVICE AND CAMERA-BASED CODE READING DEVICE

(71) Applicant: Sick AG, Waldkirch (DE)

(72) Inventor: Pascal Schüler, Waldkirch (DE)

(73) Assignee: SICK AG, Waldkirch (DE)

( * ) Notice: Subject to any disclaimer, the term of this patent is extended or adjusted under 35 U.S.C. 154(b) by 47 days.

(21) Appl. No.: 17/869,180

(22) Filed: Jul. 20, 2022

(65) Prior Publication Data

US 2023/0032900 A1 Feb. 2, 2023

(30) Foreign Application Priority Data

Jul. 30, 2021 (EP) .................................. 21188808

(51) Int. Cl.
*G06K 7/10* (2006.01)
*G06K 7/14* (2006.01)

(52) U.S. Cl.
CPC ..... *G06K 7/10851* (2013.01); *G06K 7/10752* (2013.01); *G06K 7/1443* (2013.01)

(58) Field of Classification Search
CPC .............. G06K 7/1404; G06K 7/1443; G06K 7/10752; G06K 7/10861
USPC .................................................... 235/462.25
See application file for complete search history.

(56) References Cited

U.S. PATENT DOCUMENTS

| 6,546,114 | B1 | 4/2003 | Venketesan |
| 10,534,942 | B1 * | 1/2020 | Cornell .............. G06K 7/10752 |
| 2013/0048722 | A1 | 2/2013 | Davis et al. |

FOREIGN PATENT DOCUMENTS

| EP | 1014292 B1 | 5/2003 |
| EP | 2843616 A1 | 3/2015 |
| EP | 3812953 A1 | 4/2021 |

OTHER PUBLICATIONS

European Search Report for corresponding European Application No. 21188808.6 dated Jan. 31, 2022.

* cited by examiner

*Primary Examiner* — Toan C Ly
(74) *Attorney, Agent, or Firm* — Nath, Goldberg & Meyer; Jerald L. Meyer

(57) ABSTRACT

A method of automatically setting up a code reading device that has an image sensor and a control and evaluation unit, wherein an example image of an example object arranged in the field of view of the image sensor and having an example code is recorded by the image sensor and at least one recording parameter and/or at least one decoding parameter for the operation of the code reading device is set with reference to an evaluation of the example image. In this respect, further example images are generated from the example image by calculational variation and the at least one recording parameter and/or the at least one decoding parameter is/are set with reference to an evaluation of the further example images.

19 Claims, 9 Drawing Sheets

Figure 1:
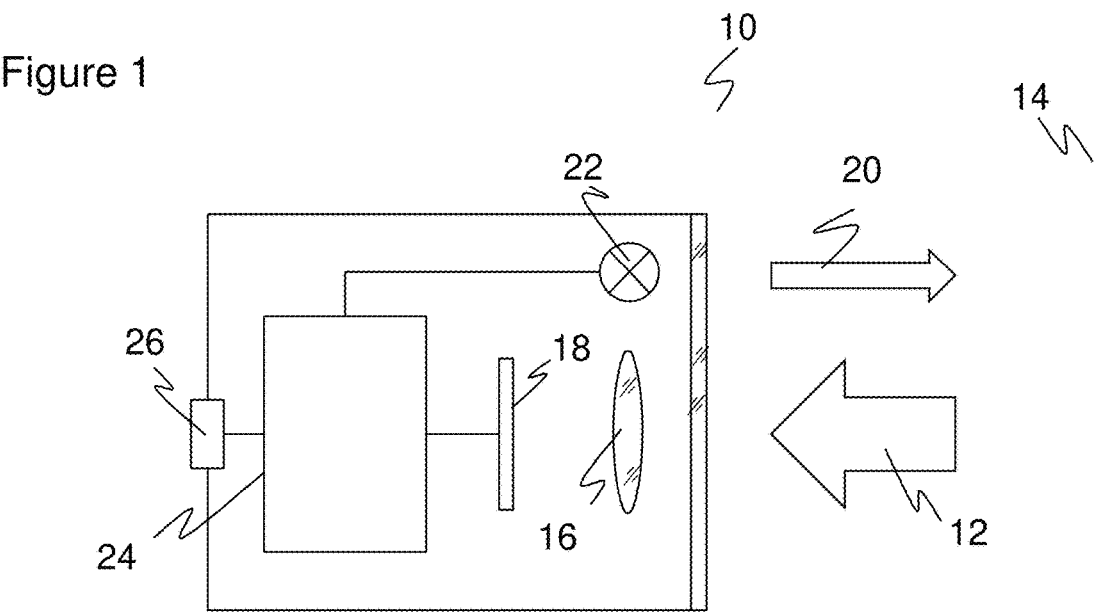

METHOD OF AUTOMATICALLY SETTING UP A CODE READING DEVICE AND CAMERA-BASED CODE READING DEVICE

The invention relates to a method of automatically setting up a code reading device and to a camera-based code reading device.

Code readers are known from supermarket cash registers, for automatic package identification, for the sorting of mail shipments, from baggage handling at airports, and from other logistic applications. A camera-based code reader records images of the objects with the codes located thereon by means of an image sensor and image evaluation software extracts the code information from these images. Camera-based code readers also cope without problem with other types of code than one-dimensional barcodes that are also built up two-dimensionally like a matrix code and provide more information.

In an important group of applications, the objects bearing a code are conveyed past the code reader. Image data that overlap more or less depending on the frame rate and the conveying speed are repeatedly recorded by the image sensor. A code reader is in many cases part of a more complex code reading system. A plurality of code readers are thus frequently provided at a reading tunnel to record objects from a plurality of sides or from all sides. The geometry of the conveyed objects is further frequently measured in advance by a separate laser scanner.

One of the most important key parameters of a code reading system is the reading rate since non-read codes result in manual reworking steps or even association errors. It is important for this to optimize the code reading system for its application, that is a suitable exposure, camera setting, and selection and configuration of decoder algorithms, including suitable pre-processing of the recorded images. This is possible by manual steps in the setting up of a code reading system, but is extremely complex and/or expensive and can only be done by an expert.

The part problem of focusing on objects of different heights is frequently solved by an autofocus system that dynamically adapts to every single object. At the same time, further camera and exposure settings can be set for the measured object height. EP 3 812 953 A1 even goes a step further and adapts its decoder dynamically to the respective object height. However, this is not a solution if no distance value is present or if the code reader only provides a fixed focus system or a so-called slow focus system that admittedly makes an adjustment of the focal position possible, but is much too slow for the dynamic adaptation to individual objects.

It is further known to determine a good parameter set in an auto-setup when putting into operation. For this purpose, a representative object having a code is selected by the operator and is detected by the code reading system while stationary. The working point determined in this manner is then, however, only optimized for the underlying standstill situation. In the actual application, however, codes that have been applied to the objects at different heights should be read in motion. In this respect, the number of the objects and the number of the labels or codes in the respective currently recorded image are also unknown. The code reading system is not prepared for these deviations from the taught standstill situation and the performance in operation therefore remains below the possibilities.

The path is therefore taken at times to determine a plurality of configurations for different objects recorded at standstill and to store them in different parameter banks. This does not yet solve the problem since which configuration is suitable for the object specifically detected next is not known. The different configurations can be iterated through, but this slows down the decoding process and ultimately again uses valuable resources for reading attempts that are doomed to fail. Such an explorative approach would basically be conceivable in that image data are experimentally recorded and processed with the most varied parameter settings and algorithms. This cannot be done in the large parameter space in practice. A concentration in at least potentially productive configurations for different taught objects is a first improvement step, but no more.

It is furthermore conceivable to further adapt the parameter set acquired during putting into operation in small steps during the actual operation. EP 1 014 292 B1, for example, discloses a method of automatically regulating characteristics of an optical code reading system that adjusts its working point over and over again. What effect this specifically has on the reading rate can only be predicted with difficulty here. Gradual changes and drifts are primarily compensated in this manner. In a typical reading situation on a conveyor belt, for example, the conditions change highly dynamically, however, simply due to the different object heights. Subsequent, rather slow and slight parameter adaptations are much too sluggish for this. More dramatic parameter adaptations in turn threaten to completely lose the initial optimization due to non-representative individual measurements.

There is thus the difficulty of optimizing a code reading system for dynamic operation, and indeed also when there are no measured values such as a distance value from the respective object and no optical settings such as a dynamic focal adjustment that can be adjusted in time. A manual optimization valid for a longer operating phase is extremely complex and prone to error due to decoding methods that are always having to be further developed and due to the large number of parameters of the camera and decoder. This results in worse reading rates in practice.

It is therefore the object of the invention to improve the parameterization of a code reading device.

This object is achieved by a method of automatically setting up a code reading device and by a camera-based code reading device in accordance with the respective independent claim. The code reading device to be set up during the putting into operation, for example, has an image sensor and a control and evaluation unit. The image sensor or a camera having the image sensor records images of objects having optical codes in later operation and the control and evaluation unit then localizes code zones and decodes the codes found, i.e. reads their respective code content. An optical code to be read can be a barcode, but also a two-dimensional code in accordance with one of the various known standards.

An example image of an example object is recorded for the setup. The example object should be selected as representative or typical for the later application and should accordingly bear at least one example code that should be read in later operation. The selection of a suitable example object is the responsibility of the operator. The method works equally with a less representative object, but will possibly find a somewhat less suitable configuration. It is conceivable that a plurality of image sensors cooperate to assemble a larger image or example image that is preferably covered in the following and is treated as a single camera or as a single image sensor with a large field of view.

At least one recording parameter and/or at least one decoding process with which the code reading device then reads code content in operation is/are set by the automatic setup using an evaluation of the example image for the later operation. A corresponding parameter set or a combination of parameters is also called a working point.

The invention starts from the basic idea of alienating the recorded example image by calculational variation and thereby to multiply it. Calculational means that the same physical starting image is varied by different processing. It is so-to-say a case of virtual example images that are only indirectly produced from a recording of the real world. This does not preclude the case of a plurality of physical starting images that that are then processed in a different manner or in the same way and are thus multiplied. An enlarged image data set with further example images is produced in this manner. The evaluation after which at least one recording parameter and/or at least one decoding parameter of a decoding process is/are set now includes the further example images. A wider base is thus created with which the future operating situation is covered better than by the physically recorded example image alone.

The process is computer implemented; it runs automatically or independently. Certain manual interventions such as a confirmation that the example object is in the field of view can be integrated in the automatic routine. The actual optimization manages without any manual steps, with it remaining up to the operator to revise manually at the end. The setup process can run in the control and evaluation unit of the code reading deice and/or at least partly in a permanently or temporarily connected processing unit such as a higher ranking control, a configuration computer, or a network, including a cloud.

The invention has the advantage that a particularly suitable working point is found by generating further example images and by evaluation of the correspondingly enlarged image data set. This working point takes account of the later dynamic operation such as moving objects and different object heights, also for variations that do not allow the example object and its example image itself to be recognized. This enables a particularly high reading rate. The time behavior of the decoder can also play a role here to which only a limited processing time up to the next image is available in the recording and evaluation of image sequences. The available decoder time is maximized by an optimized working point or a higher frame rate can be set. The complex optimization task can be carried out fast and inexpensively by the automated routine. In-depth expert knowledge such as in a manual optimization is not required and the automation contributes to error avoidance. A subsequent fine adjustment is possible. Changes such as a decoder update can be responded to very simply by a repeat running through of the then possibly shortened process.

The evaluation of an example image preferably has a decoding attempt. Decoding attempt means that at least one decoder or decoding process is applied to the example image to read the code content of a code in the example image. Such reading attempts are carried out depending on the step within the setup using a physically recorded example image or with a virtually generated further example image. The success of the decoding attempt is evaluated, binary in the simplest case, as to whether the code was able to be read (GoodRead) or not (NoRead). A quality measure of the decoder is preferably additionally determined from which it is possible to estimate the additional quality losses at which reading would still have been possible. A respective working point thus becomes testable or verifiable at the real decoder that is used in later operation. This is ultimately the most relevant evaluation instance. Changes of the decoder version, for example after a software update, can be responded to very simply using the same setup process in this manner. The progress by continuous improvements of the algorithms for the decoding is thus assisted by a respective active working point.

The at least one recording parameter preferably has a light sensitivity (gain), an exposure time (shutter), a frame repetition rate, and/or a focal position of an optics arranged in front of the image sensor. They are important parameters; in particular sufficiently sharp images are thereby recorded by a suitable focal position with an influence on further image parameters such as the contrast and sufficiently bright, simultaneously not distorted images with as few movement artifacts as possible by light sensitivity and exposure time. The decoding parameters relate, for example, to the kind of codes to be read, the selection of the decoding algorithms, a module size, or possible preprocessing steps such as a noise filter or super-resolution for an improvement of resolution. The decoding time available to the decoder between two recordings should be used to the optimum. The faster the decoder is, the higher the frame rate can be selected so that more chances arise to record a respective code in a manner suitable for its reading.

Further example images for different object sizes are preferably generated, in particular one further example image for a minimal object height and maximum object height expected in subsequent operation. The object size corresponds to the spacing between the image sensor and the recorded object surface that comes the closer to the image sensor, the larger the object is, and vice versa. In this respect, the idea is mostly derived from an assembly of a camera from above; the decisive dimension of the object size is then the object height. On an assembly from a different perspective, the object height is to be understood accordingly. Further example images for different object sizes are a particularly preferred and relevant example for a change for the calculational expansion of the image data set for the fixing of a working point since the different object sizes or object heights inter alia have an effect on the focal position or the deviation therefrom and on the exposure and thus central quality criteria of the images. The working point is not only optimized for the one object size or object height of the example object, but rather for all the object sizes or object heights to be expected. Further example images for the extremes of a minimal and maximum expected object height are in particular generated, again preferably exactly one in each case. Overall, three example images are then produced, two thereof virtually for a maximum distance of a low recorded object, for example on a conveying level, and one minimal distance for a high recorded object, and the physically recorded example image for an object of an intermediate size or intermediate height. The assumption is that if the decoder can cope with the extreme cases, this is definitely the case for intermediate states. The generation of more than two further example images at different object sizes or object heights or on a variation of other influences than the object size or the object height is additionally conceivable.

The further example images are preferably generated by a resolution increase or a resolution decrease, also called upsampling and downsampling. This then corresponds to a virtual recording from a larger or smaller distance corresponding to an assumed object size or object height. A bicubic interpolation is a particularly suitable method. The example image is preferably centered on the example code and is cropped after an upsampling or is supplemented at the edges with preset content without a code structure after a downsampling. The further example images thus have a uniform format and the relevant image content is maintained.

The further sample images are preferably generated with a blur corresponding to an expected incorrect focusing. An only limited depth of field range belongs to the focal position at which the physical example image was recorded. A later physical recording of a particularly small or large or low or high object is disposed at the margin or beyond this depth of field range. This defocusing is preferably taken into account. The effect of the objective can be calculationally simulated for this purpose, for example by folding the further example image with the point spread function (PSF). A folding with a Gaussian core with a standard deviation that is derived from the defocusing is suitable as a preferred approximation. The point spread function or another filter core, in particular a Gaussian core, can be calculated in advance and stored for different focal positions and deviations therefrom.

A result of the evaluation of calculationally generated further example images for different object sizes can be that the total desired spread of object sizes cannot be covered by only one working point. The operator thus receives fast feedback as to whether the desired object height variance can be processed and optionally an indication of an object height variation that can still be represented or a possible upgrading or reequipping of the code reading device to make the original specifications possible.

Further example images are preferably generated by displacement of image content. This simulates the later movement in operation. Images are recorded at different relative positions between the image sensor or the camera and the object. Further example images for a fully impacted code and a code in a marginal location are preferably generated. The latter as a rule requires more decoder time until an only partially detected code could still be read. A required decoder time and from it an implementable frame rate or frame repetition rate can thus be determined. It is conceivable to combine the displacement of image content with different assumed object sizes or object heights.

The further example images are preferably generated with an expected motion blur. The motion in operation does not only generate different object positions and code positions in the image, but also motion blur that makes a reading of the code more difficult or prevents it. The motion blur can be generated in a similar manner to an already explained blur for a defocused recording, in particular by folding with a Gaussian filter core. The deviation from a focal position is now not decisive for the design of the filter core, for instance a standard deviation for the Gaussian filter core, but a standard deviation equal to the module width in pixels per module (ppm, pixels per module) is rather selected, for example.

An initial value for the at least one recording parameter and/or decoding parameter is preferably first determined so that the example code can be read. It is therefore first ensured as the basis of the optimization for the later dynamic operating situation that the example code itself can be read at all. This is a.so called first reading. Depending on the embodiment, the initial values are to be understood in the sense of good enough, i.e. the example code is read at all (Good Read) or an optimization for the static case is already carried out using the method outlined in the introduction. Alternatively to an intelligent optimization of the static case, a trying out of parameters would also be conceivable until the example code is read at all or even optimally. Sufficient time is available during the setup for such brute force approaches.

The at least one recording parameter and/or decoding parameter is/are preferably fixed by an optimization process with a testing in a parameter space of the recording parameters and/or decoding parameters. The optimization preferably starts in initial values in accordance with the previous paragraph since it is to be assumed that an optimum can be found more reliably and faster from there than with generic or random initial values. A simple optimization process tries out the parameter space in predetermined steps iteratively about the initial value and subsequently selects the parameter set with the best result or interpolates such a parameter set between the tested steps. Alternative optimization processes are also conceivable, for example a hill climbing that moves in the parameter space in the direction of better reading results and in this process in particular shortens the increments. A particularly interesting part of the parameter set relates to the focal position and to the light sensitivity so that the optimization can move in at least a part process while keeping the other parameters in this part space.

The example image is preferably recorded again at a setting in accordance with an at least one recording parameter to be tested. A new image data set is thus generated within the optimization cycles at the instantaneously tested working point with at least one real example image and associated further example images by calculational modification, for instance by upsampling/downsampling and/or displacement of image content.

A plurality of example images are preferably recorded at a focal position to be tested and at a plurality of light sensitivities. The effects of the light sensitivity are thus not calculationally predicted, but rather measured physically by a plurality of recordings. The remission behavior of the example object is thus detected. The influence of a different light sensitivity can be simulated, calculated, or taught in advance for an ideal reference object with known or fixed remission behavior. This method can now be rescaled with the measured remission behavior. This produces a combination of real effects and virtual alienation, with the prediction being substantially improved for the calculational determination of further example images, in particular with different assumed object sizes.

The setup preferably takes place with only one single example object. This substantially simplifies and accelerates the setup. In accordance with the prior art, a working point would be found that is just optimized for the single example object in its recording situation. This will generally be an incorrect optimization for the subsequent dynamic operating phase. In accordance with the invention, in contrast, a generalization on later dynamic situations, in particular with different object sizes and/or object heights and/or motion is made by the generation of further example images from the presentation of the single example object. The behavior of the decoder is also verified for this dynamic situation due to the further example images and a practical optimum working point is located. The only example object can in another respect by all means be recorded multiple times at different working points as part of the optimization depending on the embodiment. This is an automatic routine and does not make the process more complicated for the operator who only has to initially take care that the only example object is arranged in the field of view of the image sensor.

It is conceivable in principle to present a plurality of example objects sequentially during setup instead of only one single example object. The setup procedure thereby becomes more complex and/or expensive, but in turn which objects are to be expected in operation becomes clearer. The optimizations can in particular be carried out separately for every example object. The results can be offset against one another, in particular averaged using an expected later object distribution. In addition, initial values for the optimization can be derived with a different example object from the optimization result for one example object.

The example object is preferably recorded at a standstill, even if a stream of moving objects is to be detected in later operation. The effect of the motion can be taken into account by the generation of further example images. An observation of productive operation with moving objects is not necessary.

A camera-based code reading device in accordance with the invention has an image sensor for recording image data and a control and evaluation unit, wherein the code reading device is set up in accordance with an embodiment of the method in accordance with the invention and is configured to detect images of objects in operation and to read optical codes applied thereto. The code reading device can have an image sensor or a plurality of image sensors or a camera or a plurality of cameras, one or more processing units and further sensors such as an encoder for determining a feed speed of a conveying device or a volume measurement system. The control and evaluation unit can be distributed practically as desired over the camera and other processing units of the code device. It is in particular conceivable during setup that the control and evaluation functionality is provided from external, either by a higher ranking control, a connected configuration processor, or a network or a cloud.

The code reading device is preferably installed as stationary at a stream of objects to be detected, in particular at a conveying device. The objects to be detected and the code reading device are thus located in a relative movement to one another. This movement and the different object sizes or object heights are preferably part of the dynamics of operation that are taken into account by the working point located in accordance with the invention. As already mentioned, the setup preferably takes place during a presentation of the example object at a standstill.

The code reading device preferably has an optics that is associated with the image sensor and whose focal position is only manually or more slowly adjustable than an expected object sequence (fixed focus, slow focus). In other words, no autofocus system is present. If an automatic focus adjustment is possible at all, it would at least be too slow to focus on the next object in time in each case. The focal position can only be adapted for a longer operating phase as part of a suitable working point. Such a code reading device is simpler, less expensive, and less maintenance heavy, and it profits to a particular degree from an optimized working point.

Figure 2:
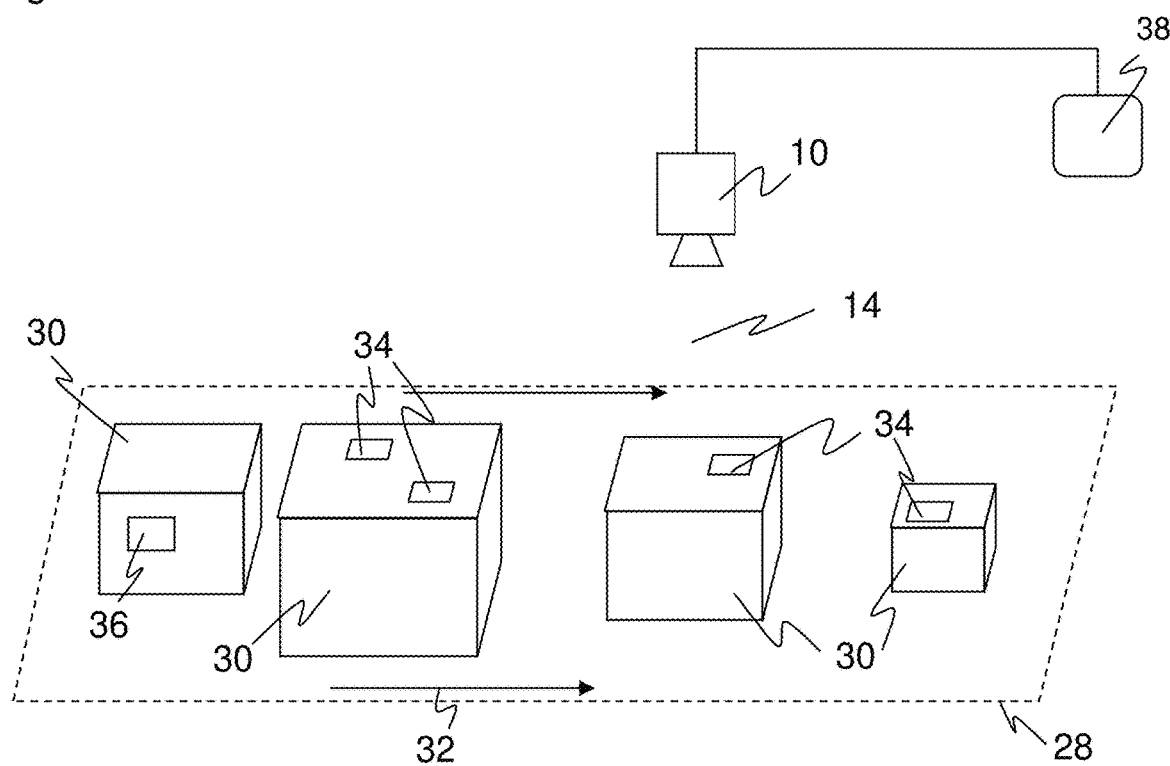
Figure 3:
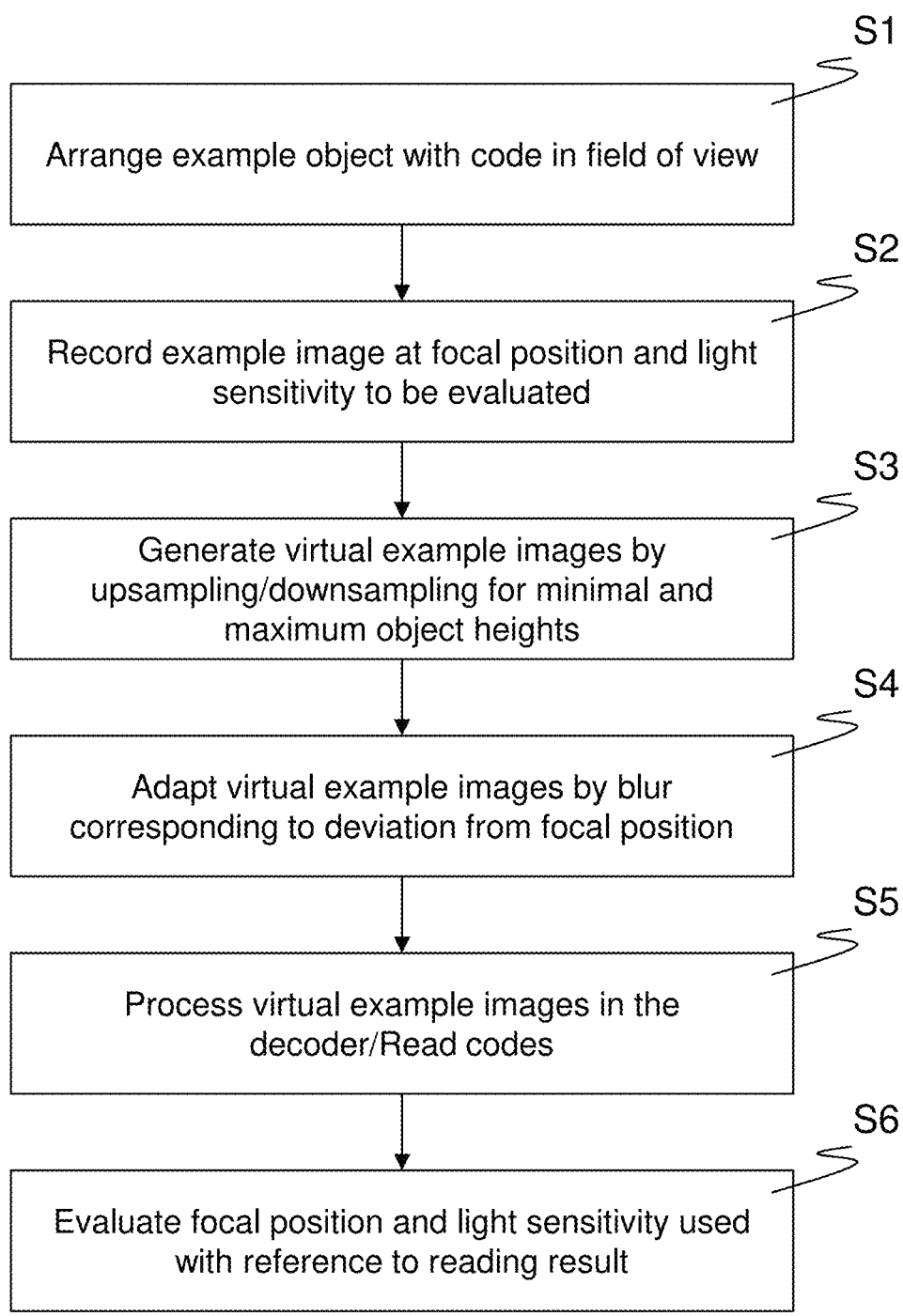
Figure 4:
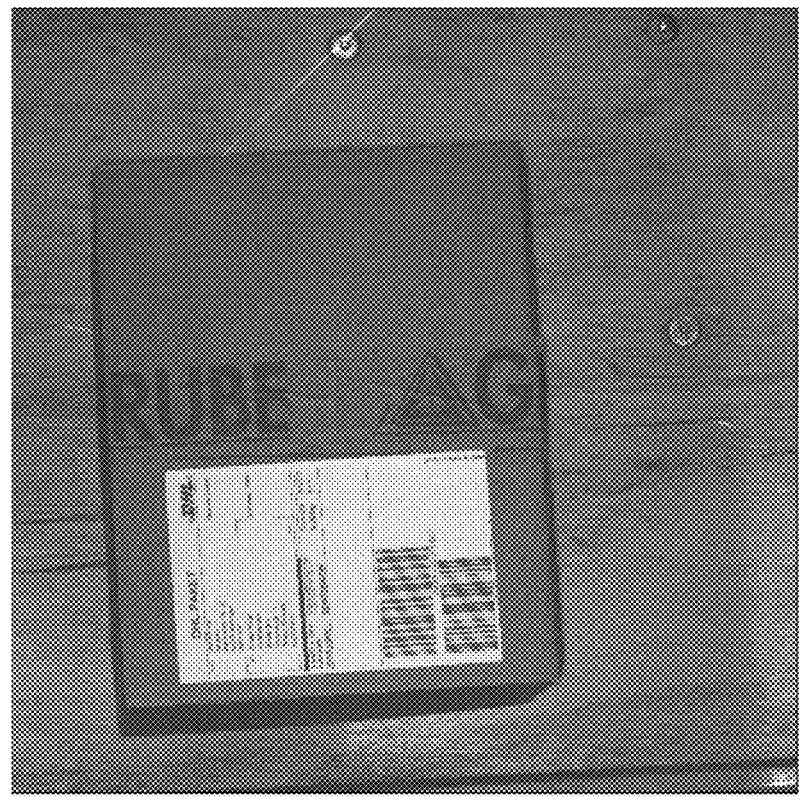
Figure 5:
Figure 6:
Figure 7:
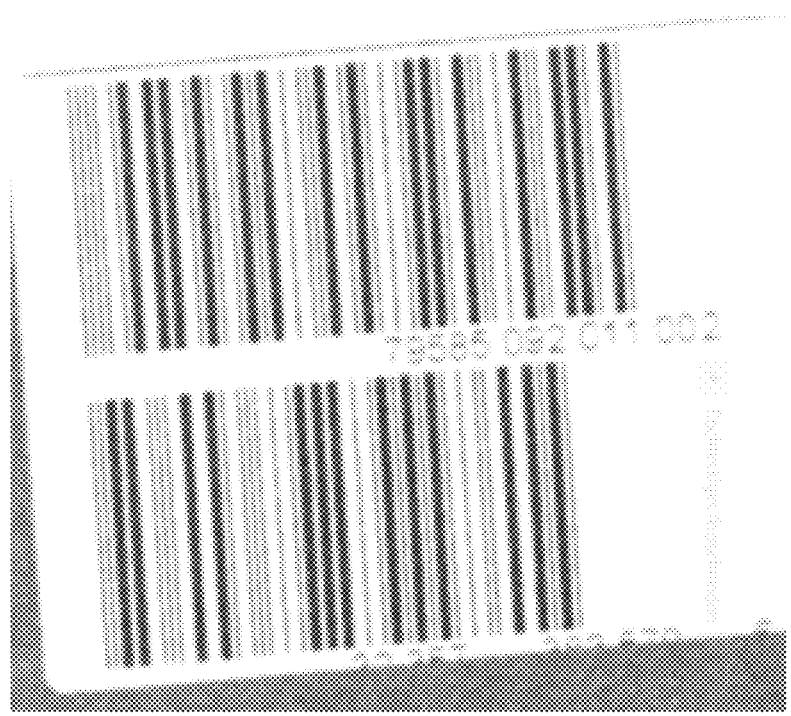
Figure 8:
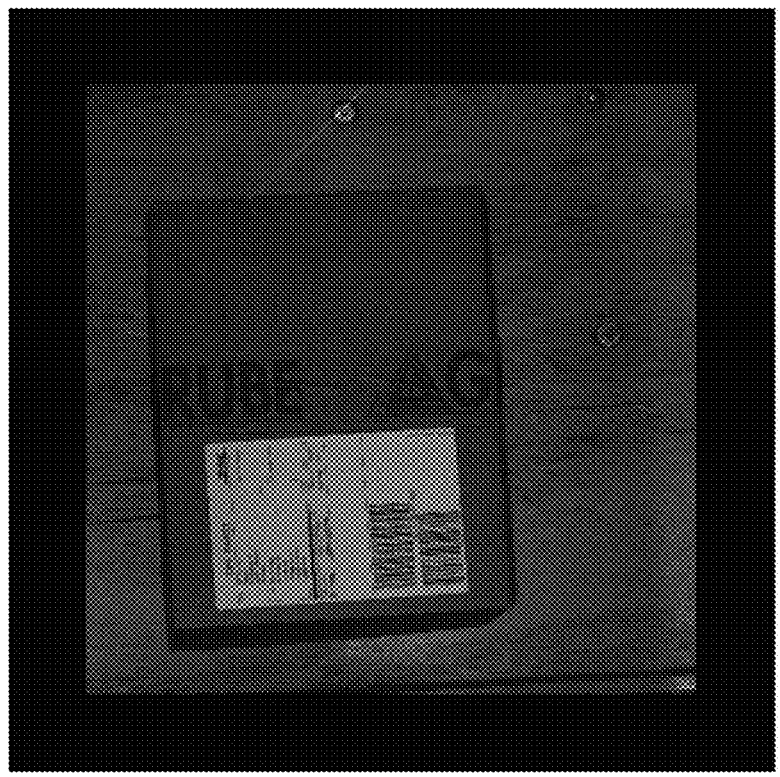
Figure 9:
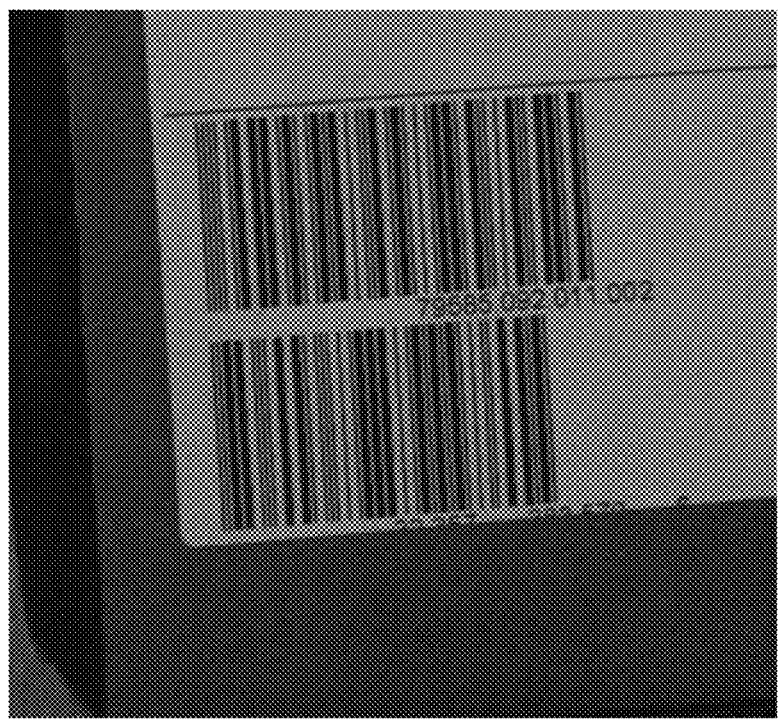
Figure 10:
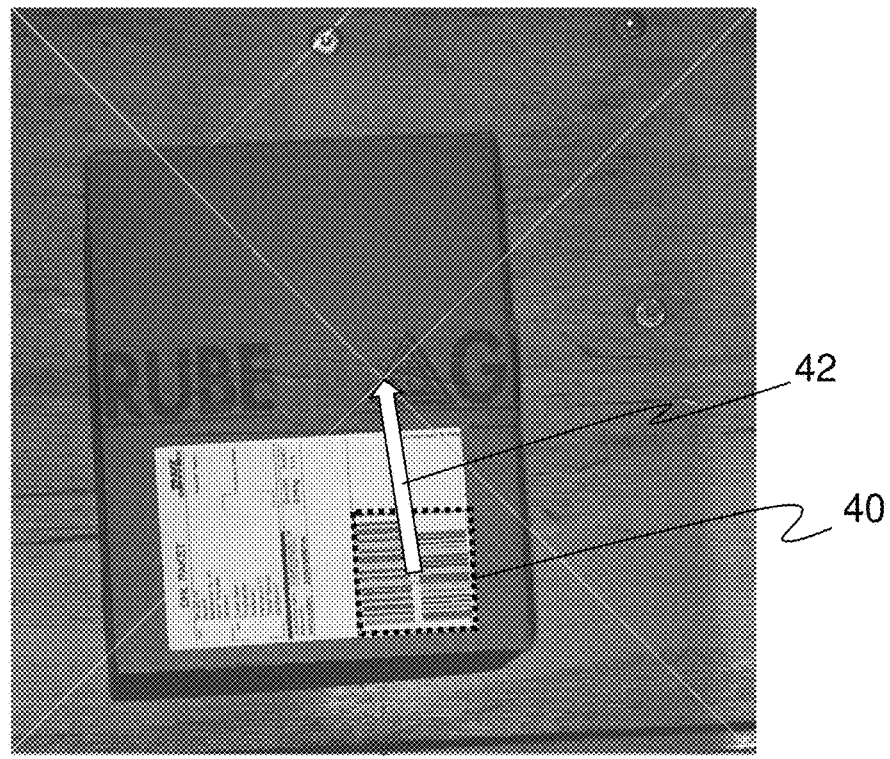
Figure 11:
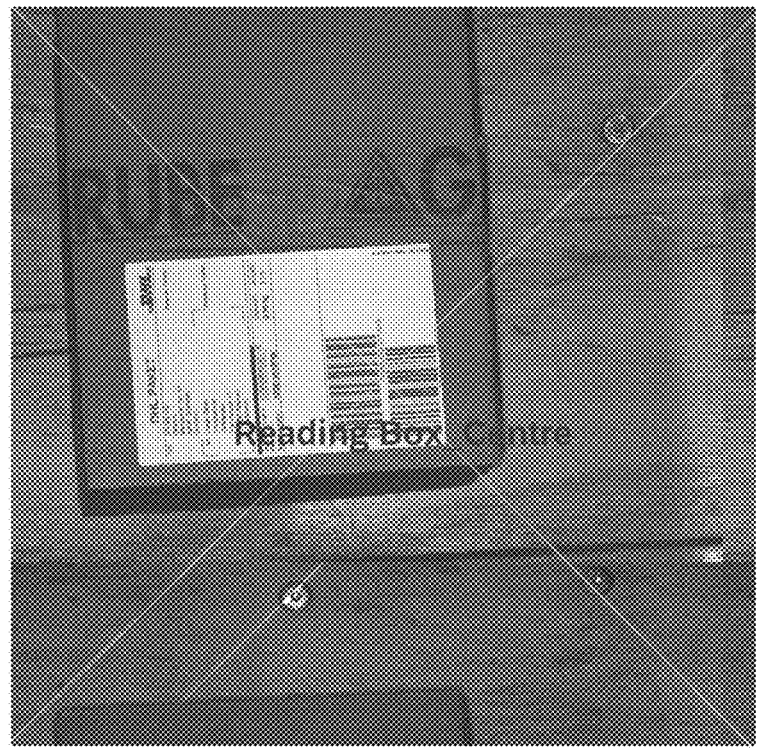
Figure 12:
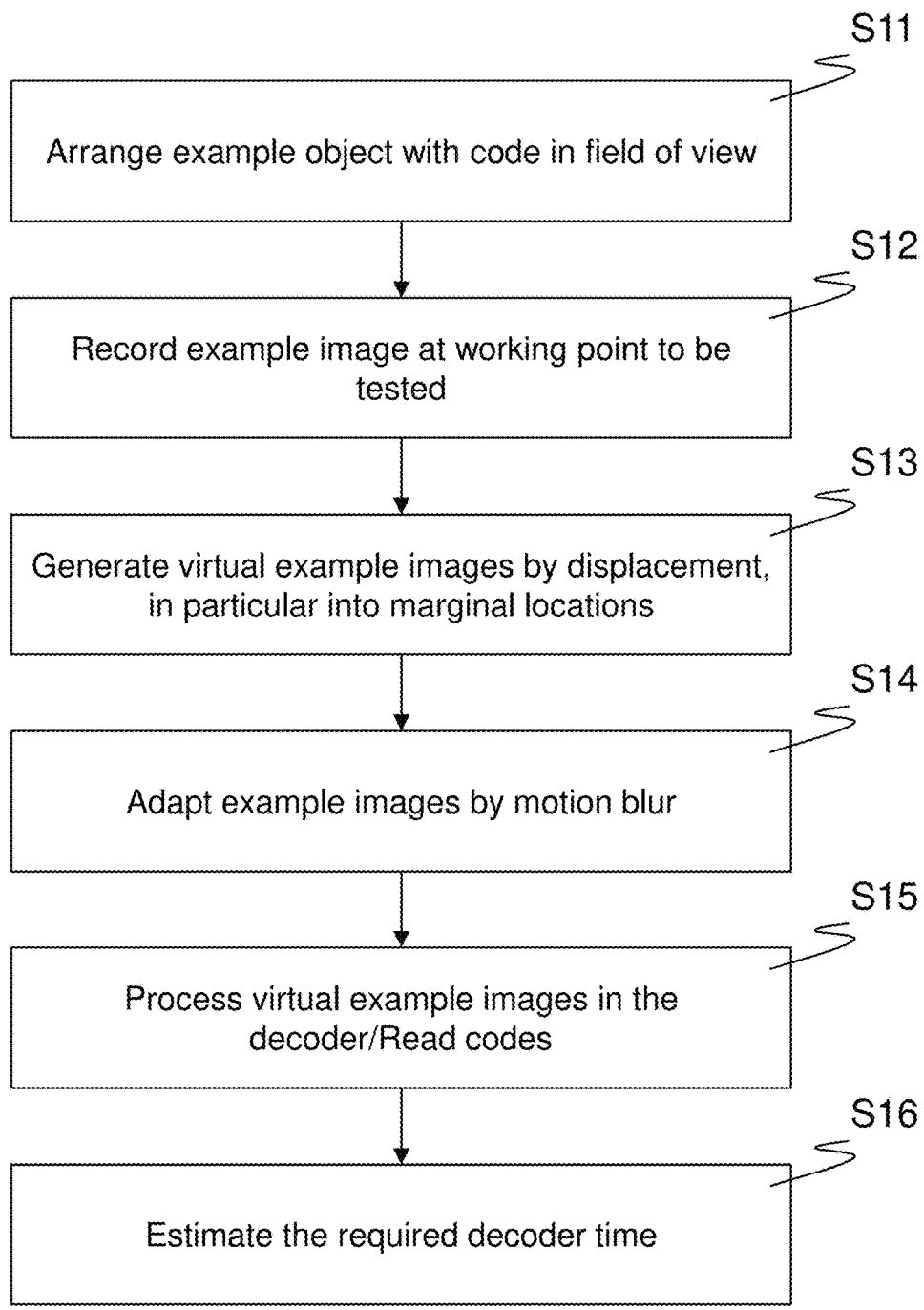
Figure 13:
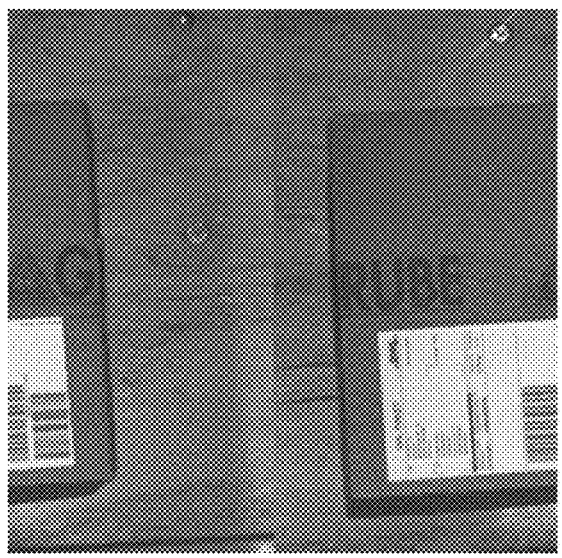
Figure 13:
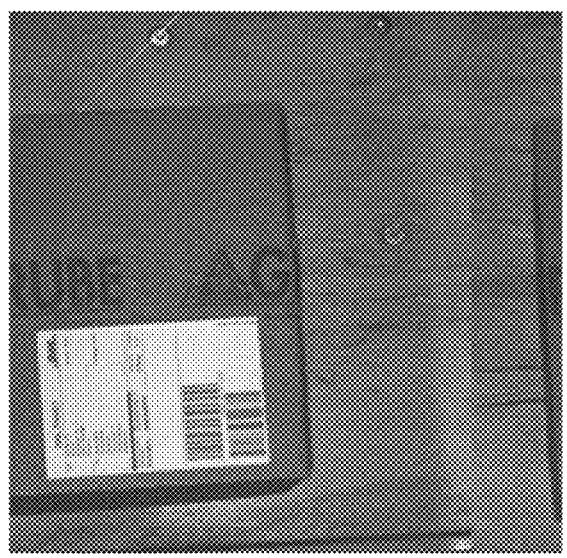
Figure 13:
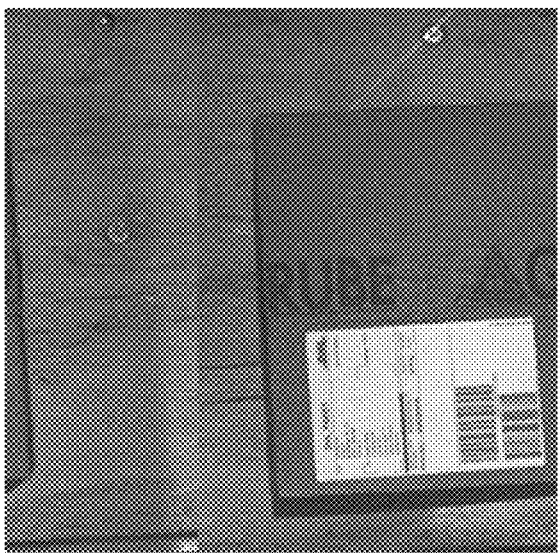
Figure 13:
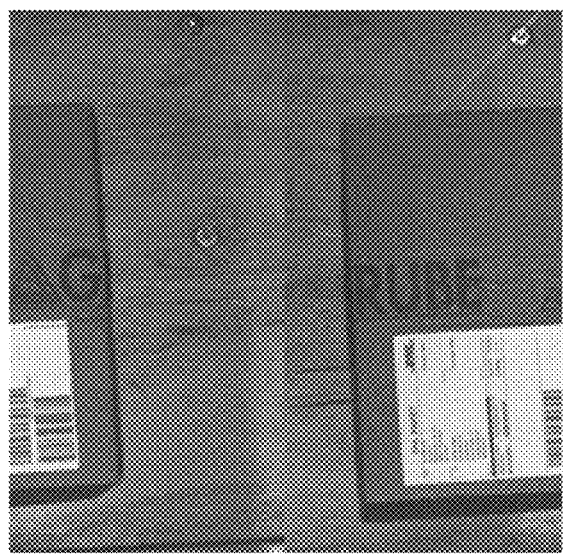
Figure 14:
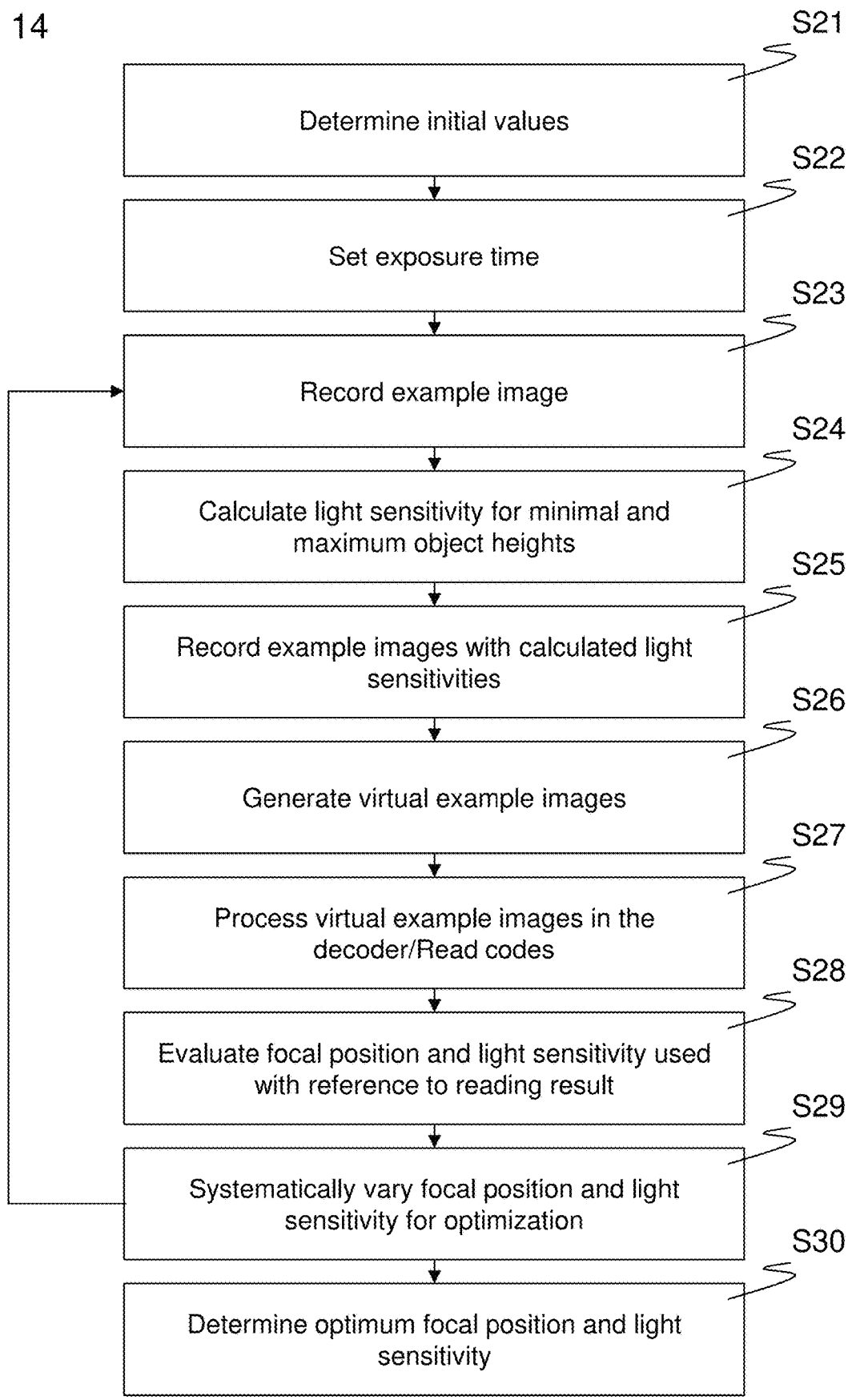

The invention will be explained in more detail in the following also with respect to further features and advantages by way of example with reference to embodiments and to the enclosed drawing. The Figures of the drawing show in:

FIG. 1 a schematic sectional representation of a camera-based code reader;

FIG. 2 a three-dimensional view of an a code reading device with a code reader in an installation at a conveyor belt;

FIG. 3 an exemplary flowchart for the adaptation of the focal position and the light sensitivity by generating virtual example images of different assumed object heights from a physical example image;

FIG. 4 an example image recorded by the image sensor of a code reader;

FIG. 5 a detail enlargement of the code in the example image in accordance with FIG. 4;

FIG. 6 a virtual example image generated from the example image in accordance with FIG. 4 at an assumed maximum object height;

FIG. 7 a detail enlargement of the code in the example image in accordance with FIG. 6;

FIG. 8 a virtual example image generated from the example image in accordance with FIG. 4 at an assumed minimal object height;

FIG. 9 a detail enlargement of the code in the example image in accordance with FIG. 8;

FIG. 10 another representation of the example image in accordance with FIG. 4 with a center of the code recognized therein and an illustration of a displacement required for a centration;

FIG. 11 a representation in accordance with FIG. 10 after a centration has taken place;

FIG. 12 an exemplary flowchart for the location and testing of optimum parameters, in particular of a frame rate, by generating virtual example images with an assumed motion;

FIG. 13 four different virtual example images with different displacements in code locations with full and only partial detection of the code; and FIG. 14 an exemplary flowchart for an optimization of the focal position and the light sensitivity using virtual example images.

FIG. 1 shows a sectional schematic sectional representation of a camera-based code reader 10. Received light 12 from a detection zone 14 is incident on a reception optics 16 that conducts the received light 12 to an image sensor 18. The optical elements of the reception optics 16 are preferably configured as an objective composed of a plurality of lenses and other optical elements such as diaphragms, prisms, and the like, but here only represented by a lens for reasons of simplicity. No autofocus system is preferably provided, but there can be the possibility of a slow focus adjustment (fixed focus, manual focus, or slow focus).

To illuminate the detection zone 14 with transmitted light 20 during a recording of the code reader 10, the code reader 10 comprises an optional illumination unit 22 that is shown in FIG. 1 in the form of a simple light source and without a transmission optics. In other embodiments, a plurality of light sources such as LEDs or laser diodes are arranged around the reception path, in ring form, for example, and can also be multi-color and controllable in groups or individually to adapt parameters of the illumination unit 22 such as its color, intensity, and direction. Contrary to the representation, the illumination unit 22 can also be external.

A control and evaluation unit 24 is connected to the image sensor 18 and the illumination sensor 22 and is responsible for the control work, the evaluation work, and for other coordination work in the code reader 10. It comprises one or more processing modules such as an FPGA and/or a microprocessor and evaluates the image data of the image sensor 18. In this respect, code zones in the image data are located and their codes are read. Differing from the representation, the control and evaluation functionality can be distributed practically as desired over internal and external modules, with the external modules also being able to be connected via a network or cloud. An external engagement of control and evaluation functionality is in particular conceivable for a setup phase that will be explained further below and for which processing and memory resources are possibly only provided temporarily. The code reader 10 outputs information such as read codes or image data via an interface 26. If the control and evaluation unit 24 is not or is not fully located in the actual code reader 10, the interface 26 also serves as a connection between an internal and an external control and evaluation.

FIG. 2 shows the code reader 10 in a preferred application situation above a conveyor belt 28 that conveys objects 30, as indicated by the arrow 32, through the detection zone 14 of the code reader 10. The objects 30 bear code zones 34 on their outer surfaces which are detected and evaluated by the code reader 10. These code zones 34 can only be recognized by the code reader 10 when they are affixed to the upper side or at least in a manner visible from above. Differing from the representation in FIG. 2, a plurality of code readers 10 can therefore be installed from different directions for the reading of a code 36 affixed, for instance, to the side or to the bottom in order to permit a so-called omnireading from all directions. The arrangement of the plurality of code readers 10 to form a reading system mostly takes place as a reading tunnel in practice. The reading system overall forms a code reading device to which further sensors, not shown, can belong such as a laser scanner for volume measurement or an encoder for determining the conveyor speed of the conveyor belt 28. A higher ranking control 38 is shown as an example for a distributed implementation of the control and evaluation functionality.

In accordance with the invention, a code reading device such as is shown by way of example in FIG. 2 and that has one or more code readers 10 explained at FIG. 1 is automatically set up for a subsequent operating phase, for example as part of a putting into operation. Setup means that recording parameters of the code reader 10 or decoding parameters of a decoder used for reading codes or of the decoding process implemented in the code reader 10 are set. Such a parameter set is also called a working point of the code reading device. An optimum working point takes account of the dynamics of operation, in particular the motion and the different object heights. In accordance with the invention, virtual example images are generated that correspond to a conceivable later reading situation that were, however, not physically recorded at all during the reading. In this respect, that dimension of the objects 30 to be detected is always called the object height that is decisive for the distance between the object 30 and the code reader 10. This is derived from the idea of a perspective from above, but corresponding dependencies also result in a different perspective from other object dimensions for which then the object height should be representative.

FIG. 3 shows an exemplary flowchart for the generation and evaluation of virtual example images for objects 30 of different assumed object heights. This so-to-say illustrates a single optimization cycle of the setup phase that tests a specific working point, with it here being the two parameters focal position and light sensitivity (gain); further parameters are separately optimized or preallocated. Sufficiently sharp images are a basic requirement for a high reading rate and equally a distortion in the near zone and images that are too dark in the far zone should be prevented. An exposure time that can, however, be calculated comparatively simply at the start of the optimization process as a quotient of the module size and the conveying speed preferably belongs to the working point. The optimization locates a working point at which a stable, secure reading over all the expected object heights is possible or it is alternatively determined that the whole desired object height interval can be covered with no working point by this code reading device.

In a step S1, an example object having a code is first arranged in the detection zone 14. The example object should be representative for the objects 30 to be detected later. The presentation preferably take place at a standstill. This facilitates the procedure and allows recordings to be generated repeatedly with different parameters during the optimization.

In a step S2, an example image of the example object is recorded. In this respect, the parameters of focal position and light sensitivity are preferably set to values to be tested in this optimization cycle. A possible implementation of the optimization will be presented later in detail with reference to FIG. 14. The focal position and the light sensitivity are initially set to average or other generic values or an optimization for the standstill is first interposed, a so-called first reading. In later optimization cycles, different focal positions and light sensitivities are then tested, either stepwise in an iterative loop or using the respective current optimization results that are then refined in the course of the optimization cycles. In a fixed focus system, the focal position is not variable; only the light sensitivity can then be optimized. Otherwise, a slow-focus system is assumed that permits slow focus changes. A further alternative is a manual focus that is adjusted by the operator in each case in accordance with exact specifications of the automatic setup process.

FIG. 4 shows an example image for illustrative purposes that was recorded at the currently set focal position and light sensitivity. It is here a real recording, a physical image of the example object. FIG. 5 shows a detail enlargement of the code zone.

Returning to FIG. 3, in a step S3, virtual example images that simulate a detection situation are generated from the physical example image as if the example object had a minimal or maximum object height. The object heights correspond to a reading distance between the code reader 10 and the object 30. Minimal and maximum object heights are a specification of the application; if these indications are missing, the reading distance from the conveying plane can be assumed for the minimal object height and a just still processable near zone of the code reader 10 can be assumed for the maximum object height.

The resolution of the example image recorded in step S2 is adapted by an upward interpolation or a downward interpolation (upsampling, downsampling) for the adaptation to the assumed minimal and maximum object heights. The core area of the code or code range preferably serves as the anchor point. A bicubic interpolation is an exemplary suitable interpolation algorithm. The basis for the alienation or generation of virtual example images is thus the actually recorded example image of the example object. Apart from the simple resolution depending on the object height, the different light energy is also taken into account for the different reading distances. For this purpose, recording can in particular take place multiple times at different light sensitivities in step S2 to take account of the remission properties of the example object. Which light sensitivities can be set for this purpose corresponding to the minimal and maximum object heights will be explained in more detail below with respect to FIG. 14.

FIG. 6 shows for illustrative purposes a virtual image generated from the physical example image under the assumption of a maximum object height; FIG. 8 shows a corresponding virtual example image under the assumption of a minimum object height. FIGS. 7 and 9 show associated detail enlargements of the respective code zone.

Returning to FIG. 3, in an optional step S4, a sharpness level is taken into account since the minimal and maximum object height as a rule will at best be disposed in the marginal zone of the depth of vision range of the set focal position. The virtual example images should have the actually sharpness level still to be expected for a realistic assumption and not that of the physical example image acquired in step 2. A possibility of taking account of a difference from the ideal focal position or at a depth of field range is the folding with a Gaussian core. This represents a good approximation of the actual point spread function (PSF) of the objective or of the reception optics 16. The matching standard deviation can be stored in a lookup table (LUT) or can be calculated with respect to the possible focal positions. It is also conceivable to calculate filter cores with the Gaussian approximation or from an alternative or more exact model in advance and to keep them available in a memory for looking up.

In a step S5, the virtual example images and optionally also the physical example image are presented to the decoder for evaluation. In this process, exactly those decoding methods are preferably applied that will also later be used in operation.

In a step S6, the focal position used and the light sensitivity used are evaluated with reference to the reading result from step S5. It can here only be determined binarily whether the code has been read (GoodRead) or not (No-Read). The decoder alternatively generates a quantitative quality measure. As part of the optimization in which the optimization cycle described at FIG. 3 is preferably run through multiple times, such a quality measure can be used to determine suitable values for the focal position and the light sensitivity for the new optimization cycle. Alternatively, the focal positions and the light sensitivities are systematically tested over certain parameter intervals and the quality measure is subsequently used to find the best focal positions and light sensitivities. The quality measure determines how reliable the code reading was possible to preferably also provide reserves for worse image qualities. A further criterion is the speed since short decoder times save processing resources and enable a faster frame rate.

In summary, preferably only one single example object is accordingly generated from one real example image and in turn additional virtual example images are preferably generated when stationary to reflect the later dynamic operating situation. An optimum working point is located with the decoder engine also used in operation as the evaluation instance, here in particular with respect to the setting of the focal position and the light sensitivity. If the decoder engine is improved, for instance as part of a firmware update, a readjustment of the working point is very simply possible by a repeat running through of the optimization, for instance when the new decoder engine manages better with blurred codes.

FIGS. 10 and 11 illustrate a centration of a recorded example image on the core area of the code or code zones to obtain a suitable anchor point for subsequently generated virtual images, in particular a resolution change. As shown in FIG. 10, a bounding box 40 is placed around the code or, if there are a plurality thereof, around the codes. Their offset from the center point should be compensated by the centration as indicated by an arrow 42. FIG. 11 shows the result of the exemplary centration. In this respect, image content that is pushed over a margin is inserted again at the oppositely disposed margin (wrap around) as on a torus.

FIG. 12 shows an exemplary flowchart for the generation and evaluation of virtual example images for objects 30 in motion. The steps are at some points similar to those of FIG. 3 and will therefore in part only be briefly explained with further details being able to be transferred. Virtual images that correspond to a reading in motion should now be generated from the recorded example image, with codes migrating over a preferred detection point and possibly only being partially recorded. To simulate this, image content is displaced and motion blur is preferably simulated.

In steps S11 and S12, an example object is first again recorded with the code in the detection zone 14 and an example image is generated. A working point tested in this optimization cycle is set here. As always, working point means a specific setting of recording parameters such as the exposure time, focal position, or light sensitivity, and/or decoding parameters. If other virtual example images are generated at this working point, these steps only have to be carried out once; steps S1 and S2 in accordance with FIG. 3 and steps S11 and S12 in accordance with FIG. 12 can be coincident, for example.

In a step S13, at least one virtual example image corresponding to a simulated movement of the recorded example object is generated. On the later reading in motion, the codes on the one side will migrate into the detection zone 14, over a preferred recording point, and out on the other side again. A plurality of recordings can be generated in operation in this time frame. Single codes, in the best case all the codes, will be fully visible in some of these recordings, only parts of codes in other recordings. Virtual example images are now generated, for example, such that a code is detected fully at least once and at a marginal position at least once, preferably twice in each case, so that the effort and the result are well balanced. Care can be taken with a barcode to select the displacement in dependence on the orientation of its code elements; this does not play any role with 2D codes. At least parts of the finder pattern should, however, preferably be visible in a marginal position in the virtual example images with 2D codes so that the decoding process makes a decoding attempt seriously at all and so realistic processing times are required.

FIG. 13 shows an example. of four such virtual example images, with one of these example images also being able to be the originally physically recorded image. The code zone is in a marginal position at the top left and bottom right; the code is fully detected at the top right and bottom left. Image content pushed beyond the margin is preferably inserted on the other side again (wrap around).

Returning to FIG. 12, only motion blur is simulated in an optional step S14. The reason for the blur is different than with a defocusing in step S4 in accordance with FIG. 3. The computational procedure can, however, be very similar; for example, a folding with a Gaussian core can be performed in which the standard deviation corresponds to the module width. This module width is predefined, for example, or is known from previous setup steps. It can in particular be restored after every successful reading attempt of a code since the code image with its pixel ranges and their dimensions are equally as present as the knowledge of the code modules.

In a step S15, the virtual example images are subjected to the decoding process analogously to step S5, preferably with the decoder engine that will be used in operation.

In the evaluation in step S16, however, differing from step S6 of FIG. 3, the objective of how well the working point is suitable for the code reading or can still be improved can preferably not be determined. The required decoder time should rather be estimated, for example an average or maximum decoder time. Only a limited time will be available between two recordings in operation; this decoder time is therefore an important measure. An optimal frame rate can in particular thus be located. Codes in the marginal position contribute decisively to the decoding time because the decoding process in a number of cases repeatedly attempts to read these codes. Realistic scenarios of the later operation are anticipated by the virtual example images. The time estimation includes the at least single, for example double, reading of each code and the codes here may be at the margin in part so that any random favorable physical example image reflects decoder times that are too short.

The two procedures explained at FIGS. 3 and 12 can be combined with one another. On the one hand, this means that both processes can be carried out after one another or nested in one another. It is, however, additionally also conceivable to generate virtual example images whose recording parameters such as the focal position and the light sensitivity and also corresponding to a movement are changed.

FIG. 14 shows a flowchart for an optimization of the working point in an exemplary detailed implementation. The explanation relates to the setting of an optimum focal position and light sensitivity with different object heights to be expected and supplements that of FIG. 3. The optimization of other recording or decoding parameters, however, takes place in a very similar, transferable manner.

Different conditions are preferably known in advance. They include the expected minimal and maximum object heights, the installation height of the code reader 10, its orientation, or a diaphragm setting that is alternatively optimized using a method in accordance with the invention. Imaging scales or reading field sizes are known or calculated in advance. The movement speed of the objects 30 or of the conveyor belt 20 is likewise specified or measured in advance. The height of the presented example object can be specified or measured. In this respect, the installation height and orientation of the code reader 10 can be used for a trigonometric conversion between the object heights and the distances between the object 30 and the code reader 10.

Two relationships are preferably still known that can be stored in any desired form, for example as a function or as a lookup table (LUT). These relationships can be modeled, simulated, or, for example, taught in the final production of the code reader 10. The one relationship relates to the dependency of the light sensitivity on the reading distance d, that is a function Gain(d) for a standard object of a known remission behavior. The second relationship relates to the blur on a deviation from an optimum focal position that can in particular be stored in the form of standard deviations of a Gaussian core or can also be derived from objective properties.

Initial values are determined in a step S21. They can be fixed preallocations. An optimization known per se is preferably carried out on the stationary example object. Differing from the heart of the invention, no virtual images are generated here. Initial values for important recording parameters such as the exposure time, the focal position, and the light sensitivity with which the code of the example object can be read are in particular found in the first reading. A selection of decoding processes or a configuration of decoding parameters can also take place here. The better the initial values are set to the physical example image with its specific remission properties, the faster an optimization in accordance with the invention will succeed for the dynamic operating situation and the less likely it will be that the optimization goes astray in the parameter space, for example at local extremes.

The exposure time is set in a step S22. This is comparatively simple since it can be calculated as a quotient of the module size or module width and movement speed. The movement speed is known or can be measured; the module size is in turn likewise known or can be determined in the first reading at the latest after a successful first reading with knowledge of the other installation and recording parameters. The motion blur is limited to a maximum of one module size by the exposure time set in this way, with it being assumed that the decoding process can still tolerate it. This consideration is in another respect also the reason for the extent of a simulated motion blur in step S14 of FIG. 12.

In a step S23, an example image of the presented example object is recorded. In the first run of the now following optimization, the recording parameters, in particular the focal position and the light sensitivity, are for this purpose set to the initial values from the first reading or alternatively generic initial values are set, for example a focal position for an average object height. The recording parameters are varied in further loop runs. A decoding attempt can take place directly since, if it is not successful, the current setting, that cannot even process the example image, cannot be the sought optimum. The loop run would then be shortened or the total optimization would be aborted to try it again with a new variation of the recording parameters or with better initial values.

In steps S24 and S25, additional physical example images are now optionally recorded at light sensitivities that correspond to the minimal and maximum object heights. In other words, example images should therefore be generated that are so light or dark as if the example object had the minimal or maximum object heights. In step S24, suitable light sensitivities are calculated therefor. The light sensitivity for the current focal position is known as the initial value or by adaptation to the respective new focal position in later runs of the optimization loop. The designation Gain(d) was already introduced above by which the light sensitivity can be converted to different distances for a reference object of fixed remission properties. The light sensitivity for the example object can thus therefore be rescaled in the focal position to find suitable light sensitivities for an object of minimal and maximum heights.

In step S25, two further physical example images for an object of minimal and maximum heights are now recorded at the same focal position with the calculated light sensitivities. The original example image can be recorded again as a precaution to preclude effects due to an intermediate movement. Three physical example images with three different brightness values are now present.

In a step S26, virtual example images are now generated. That has in principle already been explained at FIG. 3, in particular its steps S3 and S4. The resolution is respectively increased and decreased (upsampling/downsampling) and the created virtual example image is cropped (with upsampling) or filled at the margins (with downsampling). A centration to the code core area can precede this. The virtual images are preferably adapted with a blur corresponding to the assumed deviation from the focal position, see step S4 in FIG. 3.

In a step S27, the virtual example images are then processed by the decoding method. A respective binary or numerical quality measure is stored. It is conceivable that some codes are not legible (NoRead), this result is also stored. If this should still be the case at the end of the optimization, the total desired range of object heights can be processed with no fixed set of recording parameters.

The decoding result is evaluated in a step S28. This has the purpose of finding a suitable variation for the next optimization cycle. In a simple optimization process that, for example, runs through a parameter range having an iteration, the intermediate evaluation can be omitted.

In a step S29, the recording parameters, in particular the focal position and the light sensitivity, are systematically varied for a further optimization cycle from step S33 onward. An abort condition is also checked here, for example whether an available optimization time has elapsed, a predetermined number of optimization cycles has been run through, or a desired general quality measure has been reached. All common optimizations are conceivable here. In the simplest case, a parameter range around the initial values is systematically tested with a specific increment. Other optimizations such as a hill climbing process change the recording parameters, in accordance with the evaluation in step S28, in a direction in which an improvement is expected.

In a concluding step S30, the optimization is ended after an abort condition has been satisfied. In a simple iterative process, evaluations are now present for the different tested recording parameters. An optimum can be selected or interpolated from them. The optimum is therefore then set so that it is a good fit for as many expected object heights as possible. Other optimization processes have already adopted the best values of the recording parameters in the course of the optimization so that a final evaluation after the satisfying of the abort condition is omitted. A weighting of expected objects or object heights can enter into the optimization process or optimization result if, for example, a number of flat or high objects are expected. The code reader 10 is configured for the following operating phase with the recording parameters, in particular the focal position and the light sensitivity, found in this manner.

If the code reader 10 does not have a focus adjustment, the other parameters can nevertheless be optimized for its then fixed, only focal position. A combination with a manual focus adjustment is also conceivable. The automatic optimization process can then provide the operator with detailed instructions in steps S29 or S30 on how the focus is to be set for the next optimization step or the following operation.

FIG. 14 relates more to the setting of the focal position and the light sensitivity. The routine for the reading in motion is, however, very similar, with the explanations on FIG. 12 having to be used in addition. The optimizations for the focal position and the light sensitivity, on the one hand, and for motion, on the other hand, can take place after one another or meshed with one another. In steps S24 to S26, movements are taken into account instead of or in addition to virtual object heights, that is image content is displaced as explained at steps S13 and S14 of FIG. 12. In this respect, virtual example images are preferably generated in which codes are contained completely and at a marginal location to offer the decoding process a realistic spectrum of example images and thus to obtain a good estimate of the decoder time. The image sequences for the simulated motion can only be generated for a fixed object height, but also for a fictive minimal or maximum object height. Possibly complementary quality measures for the focal position and the light sensitivity can be acquired therefrom. A realistic estimation of the decoding time allows the determination of an achievable frame rate at the respective tested working point. It can then be used to set the frame rate, but can also be a criterion for discarding the working point or at least reducing its evaluation in the sense of the optimization because the decoder would be too slow here.

Module size intervals can be tested with a similar routine or integrated therein or connected thereto. Virtual example images are generated with scaling factors for this purpose so that minimal or maximum module sizes or module widths to be read are produced. An attempt is then made to decode them. It is then thus ensured that module sizes can be read in the interval or that an output is possible as to which module sizes will be legible.

In summary, an optimization takes place on the basis of a mixture of real effects such as the exposure time, the focal position and the light sensitivity for physically recorded example images in combination with artificial or computational alienation for virtual example images. Different object heights and movement can thus inter alia be included in the optimization, that is dynamic effects of the later operation that do not exist in reality during the presentation of the example object. A very small number of physical recordings, preferably of only a single presented example object is sufficient here and the number of virtual example images generated therefrom can also remain small. This is therefore in no way comparable with a dynamic adaptation to a plurality of real object detections such as in the prior art named in the introduction or even with a number of examples required for a training for machine teaching.

The physical and/or real example images can be displayed to track the optimization process and optionally also to intervene, that is, for example, to preclude example images as not realistic or not to be expected in operation. The total optimization process could in principle be implemented in total via lookup tables. However, this is extremely laborious and additionally inflexible, for example with respect to changes of the decoder version.

The invention claimed is:

1. A method of automatically setting up a code reading device that has an image sensor and a control and evaluation unit, wherein an example image of an example object arranged in the field of view of the image sensor and having an example code is recorded by the image sensor and at least one of at least one recording parameter and at least one decoding parameter for the operation of the code reading device is set with reference to an evaluation of the example image,
wherein further example images are generated from the example image by calculational variation and at least one of the at least one recording parameter and the at least one decoding parameter is set with reference to an evaluation of the further example images.

2. The method in accordance with claim 1,
wherein the evaluation of an example image comprises a decoding attempt.

3. The method in accordance with claim 1,
wherein the at least one recording parameter comprises a light sensitivity, an exposure time, a frame repetition rate, and/or a focal position of an optics arranged in front of the image sensor.

4. The method in accordance with claim 1,
wherein further example images for different object sizes are generated.

5. The method in accordance with claim 4,
wherein the further example images for different object sizes comprise one further example image for a minimal object height and maximum object height expected in subsequent operation.

6. The method in accordance with claim 4,
wherein the further example images are generated by a resolution increase or a resolution decrease.

7. The method in accordance with claim 6,
wherein the further example images are generated by means of bicubic interpolation.

8. The method in accordance with claim 4,
wherein the further example images are generated with a blur corresponding to an expected incorrect focusing.

9. The method in accordance with claim 1,
wherein further example images are generated by displacement of image content.

10. The method in accordance with claim 9,
wherein the further example images are generated with an expected motion blur.

11. The method in accordance with claim 1,
wherein an initial value for the at least one recording parameter and/or decoding parameter is first determined so that the example code can be read.

12. The method in accordance with claim 1,
wherein the at least one recording parameter and/or decoding parameter is/are set by an optimization process with a testing in a parameter space of the recording parameters and/or decoding parameters.

13. The method in accordance with claim 12,
wherein the example image is recorded again at a setting in accordance with an at least one recording parameter to be tested.

14. The method in accordance with claim 12,
wherein a plurality of example images are recorded at a focal position to be tested and at a plurality of light sensitivities.

15. The method in accordance with claim 1,
wherein the set up takes place with only one single example object.

16. A camera-based code reading device having an image sensor for recording image data and having a control and evaluation unit that is set up in accordance with a method of automatically setting up a code reading device that has an image sensor and a control and evaluation unit, wherein an example image of an example object arranged in the field of view of the image sensor and having an example code is recorded by the image sensor and at least one of at least one recording parameter and at least one decoding parameter for the operation of the code reading device is set with reference to an evaluation of the example image,
wherein further example images are generated from the example image by calculational variation and at least one of the at least one recording parameter and the at least one decoding parameter is set with reference to an evaluation of the further example images and the control and evaluation unit is configured to detect images of objects in operation and to read optical codes applied thereto.

17. The code reading device in accordance with claim 16, that is installed as stationary at a stream of objects to be detected.

18. The code reading device in accordance with claim 16, that is installed as stationary at a conveying device.

19. The code reading device in accordance with claim 16, that has an optics that is associated with the image sensor and whose focal position is only adjustable manually or more slowly than an expected object sequence.

* * * * *